United States Patent

Lusk

[15] 3,638,348

[45] Feb. 1, 1972

[54] EVERSET ELECTRIC RODENT TRAP

[72] Inventor: William J. Lusk, 9452 W. 130th St., Strongsville, Ohio 44136

[22] Filed: Apr. 15, 1970

[21] Appl. No.: 28,863

[52] U.S. Cl. ................................................43/75, 43/78
[51] Int. Cl. ................................................A01m 23/38
[58] Field of Search.........................43/73, 75, 77, 78, 85, 98

[56] References Cited

UNITED STATES PATENTS 2,599,541  6/1952  Burns........................................43/75
1,641,062  8/1927  Bacon........................................43/78
3,362,100  1/1968  Winkler......................................43/78

*Primary Examiner*—Warner H. Camp

[57] ABSTRACT

A base having an inclined forward wall, a housing mounted upon the base with a forward end of the housing extending over the inclined wall, the lower end of the housing having an access opening for a rodent, the housing containing an electric solenoid for closing together a pair of jaws against a rodent therebetween and who has been reaching toward a bait in a bait chute above the jaws, the tugged bait closing an electric switch for completing an electric circuit to the solenoid and closing the jaws.

1 Claims, 3 Drawing Figures

PATENTED FEB 1 1972 3,638,348

INVENTOR
WILLIAM J. LUSK

EVERSET ELECTRIC RODENT TRAP

This invention relates generally to rodent exterminators.

A principal object of the present invention is to provide and everset electric rodent trap having self-contained means for destroying rats or mice and wherein the bait remains intact without destruction from the rodents so that the trap can remain operative for destroying rodents over a relatively long period of time.

Another object of the present invention is to provide an everset electric rodent trap that is electrically operated and which is accordingly always in a set position even after having destroyed a rodent so that the same is ready for use for the next one.

Other objects of the present invention are to provide an everset electric rodent trap which is simple in design, inexpensive to manufacture, rugged in construction, easy to use and efficient in operation.

These and other objects will be readily evident upon a study of the following specification and the accompanying drawing wherein.

Figure 1:
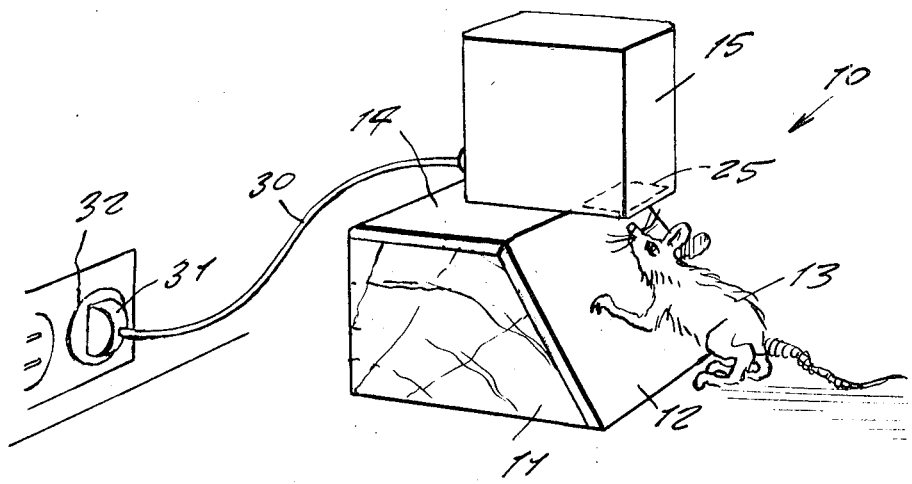
FIG. 1 is a perspective view of the present invention.
Figure 2:
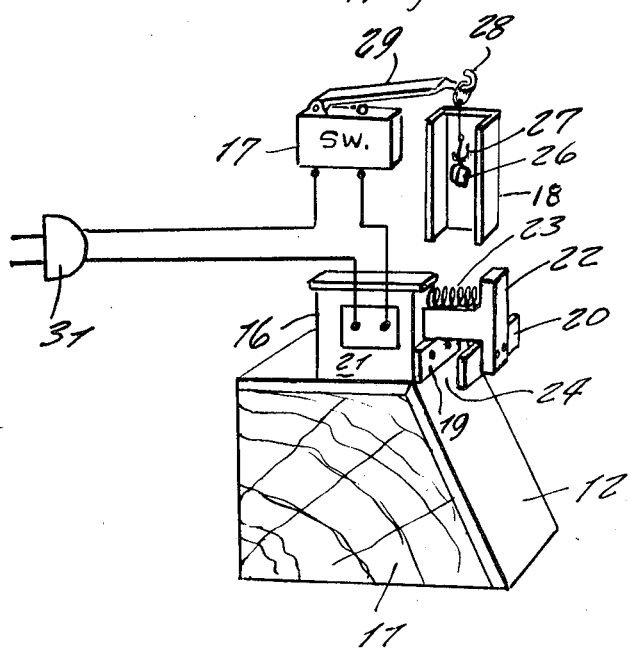
FIG. 2 is an exploded perspective view of the electric components thereof.
Figure 3:
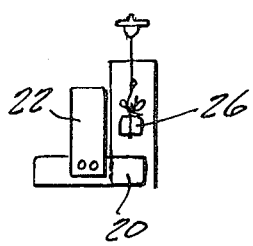
FIG. 3 is a fragmentary front elevation view of the present invention.

Referring now to the drawing in detail, the reference numeral 10 represents an everset electric rodent trap according to the present invention wherein there is a hollow base 11 which is made of plywood panels, the base 11 having a forward inclined wall 12 so that a rodent 13 is able to climb thereupon.

Upon the upper side 14 of the base 11 there is mounted a housing 15 having a forward portion thereof extending over the inclined wall 12 as shown in FIG. 1. Within the housing 15 there is contained a solenoid 16, an electric microswitch 17 and a bait chute 18.

The bait chute 18 is located in a forward upper portion of the housing 15, the bait chute being located directly over a pair of jaws 19 and 20 supported on the solenoid 16. The jaw 19 is secured to the stationary body 21 of the solenoid 16 while the jaw 20 is secured to a T-shaped armature 22 of the solenoid. A return spring 23 between the T-shaped armature and solenoid body 21 normally maintains the armature in an extended position so that the jaws 19 and 20 are separated from each other and form a space 24 therebetween. The space 24 is located directly over the lower opening 25 in the housing 16 and which serves as an entrance for the rodent 13.

The bait chute 18 may comprise a channel configurated member or the equivalent and wherein there is supported a depending bait 26 secured to a hook 27 and which is supported from a hook-type hanger 28 on a pivotable contact arm 29 of the microswitch 17.

In operative use, an extension cord 30 leading outwardly of a rear side of the housing 15 and having a conventional plug 31 secured to the outer end thereof is then connected to an electric outlet socket 32. The hook being baited, the trap thus remains everset for catching a rodent and meantime not using any electricity. When a rodent is attracted by the bait, the rodent attempts to climb up the inclined wall 12 and enter the bottom opening 25 of the housing, the rodent then squeezing between the jaws 19 and 20 until he contacts the bait. A slight movement of the bait closes the switch 17 which now activates the solenoid so to draw inwardly the T-shaped armature thus closing the jaws together and crushing the rodent which now simply drops downwardly, the trap immediately thus being reset for a next rodent.

In actual tests, the trap has proved successful by exterminating without any attention a relatively large number of rodents while the bait remained unchanged for two months, the bait being not chewed at all.

What I now claim is:

1. In an everset electric rodent trap the combination of a base, a housing mounted upon said base and including an access opening, electrically operated mechanism contained within said housing, said mechanism including means for catching said rodent and destroying its life, said base comprising hollow member formed form a plurality of plywood panels, said hollow base including a forward wall which is upwardly inclined so that a rodent may climb thereon to said access opening, a forward portion of said housing extending over said inclined front wall of said hollow base, said access opening of said housing being located directly over said inclined front wall and said rodent climbing said wall thus has access to enter said opening, means for crushing said rodent including a solenoid having a T-shaped armature, said T-shaped armature supporting a jaw, and the stationary body of said solenoid supporting a second jaw, said jaws being normally maintained in spaced-apart relation providing a space therebetween and through which said rodent may attempt to pass, said housing further containing a bait chute positioned above said space between said jaws, said bait chute containing a bait supported from a depending hook secured to a hook-type hanger at one end of a pivotable contact arm of a microswitch, said switch and said solenoid being in series electrical circuit with a power source.

\* \* \* \* \*